3,179,689
CHLORO COMPOUNDS PREPARED BY REACTING A TRIMETHYLOLALKANE AND PHOSPHORUS TRICHLORIDE

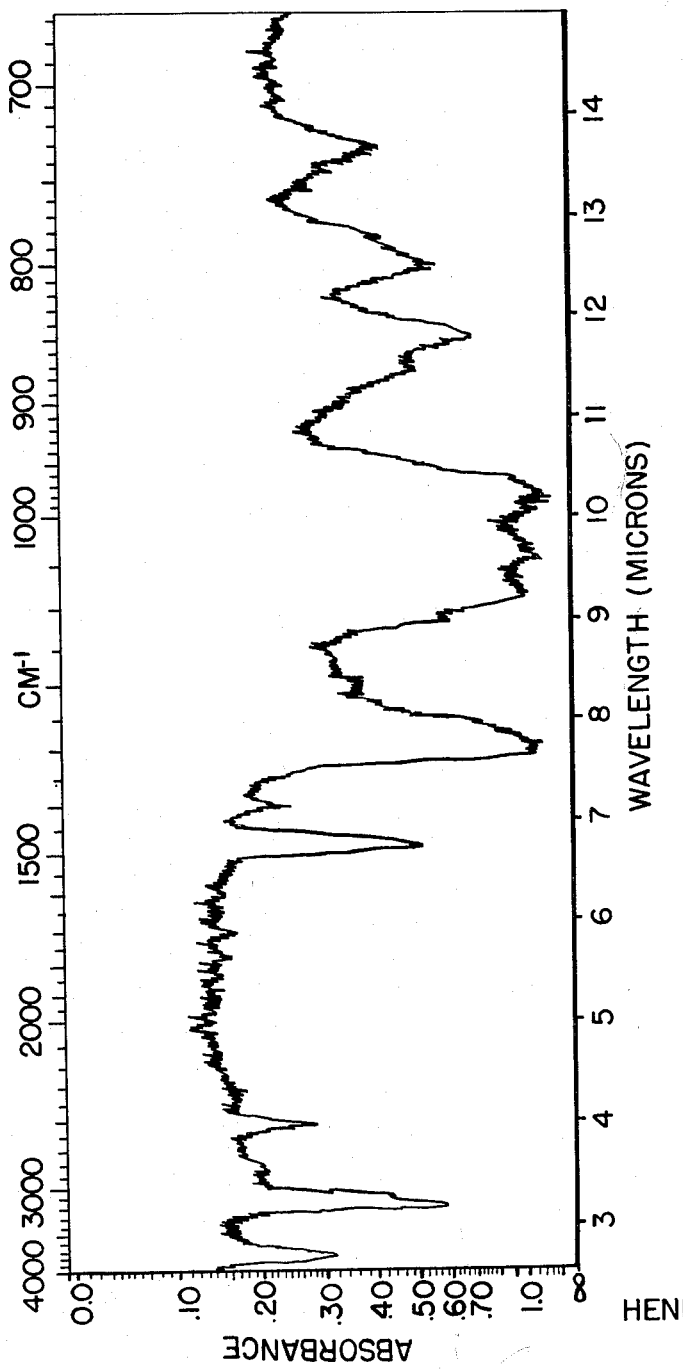

Henry Gould, West Orange, N.J., assignor, by mesne assignments, to Union Carbide Corporation, a corporation of New York
Filed Aug. 28, 1962, Ser. No. 220,022
9 Claims. (Cl. 260—461)

This application is a continuation-in-part of application Serial No. 66,942, filed November 4, 1960, and now abandoned.

This invention relates to novel phosphorous compounds.

It is an object of the present invention to prepare novel phosphorus containing antioxidants and lubricant additives.

Another object is to prepare novel phosphorus and chlorine containing organic compounds.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting trimethylolethane or trimethylolpropane with phosphorus trichloride to prepare novel phosphorus containing compounds.

The compound from trimethylolpropane is preferred since it has proven especially valuable as a lubricating fluid additive.

The single figure of the drawings is a infrared spectrum analysis of the trimethylolpropane phosphorus trichloride product.

The reaction can be carried out at a temperature of from 40° C. to the boiling point of $PCl_3$ (73.5° C. at 760 mm.). Thus a temperature of 60–65° C. can be employed. At lower temperatures the reaction mixture tends to thicken.

It has been found preferable to employ temperatures above the boiling point of $PCl_3$ to hasten the reaction, eliminate frothing and keep the acid number of the product at a minimum. The presently preferred temperature is 100–115° C. although higher temperatures, e.g. 135° C., 150° C. and 175° C. can be employed. The phosphorus trichloride is introduced below the surface of the trimethylolalkane and reacts before it can go off as a gas.

The process is preferably carried out at atmospheric pressure but super or subatmospheric pressures can be employed.

The gaseous hydrogen chloride formed by the reaction is removed and collected.

In the reaction the reactants, i.e, the $PCl_3$ and trimethylolalkane, are preferably employed in equimolar amounts.

Unless otherwise indicated, all parts are by weight.

Example 1

There was gradually added 5.0 parts (36.4 mols) of phosphorus trichloride to 4.9 parts (36.5 mols) of trimethylolpropane at 60–65° C. The mixture was continuously stirred. The hydrogen chloride evolved was collected over water. After addition of the phosphorus trichloride was completed, the viscous mixture was heated to 100° C. to facilitate removal of hydrogen chloride. The pot residue was then heated in vacuo (15 mm.) at 160° C. to help remove residual amounts of hydrogen chloride.

The viscous, colorless, odorless, liquid product obtained had an $n_d^{25}$ 1.4940. The product was nonvolatile and stable at temperatures up to 160° C. and higher.

The product contained an average of 0.5 chlorine atom per trimethylolpropane unit.

Infrared analysis of the liquid product is shown in the single figure of the drawings. It will be observed that the spectrum of the product shows an OH band at 3740 cm.$^{-1}$, a CH stretch at 3100 cm.$^{-1}$, a P—H band at 2500 cm.$^{-1}$, a peak at 1480 cm.$^{-1}$, an intense P=O band at 1285 cm.$^{-1}$, an intense absorption in the O—P region ranging from 975 cm.$^{-1}$ to 1080 cm.$^{-1}$, a peak at 848 cm.$^{-1}$, a peak at 798 cm.$^{-1}$, and a peak at 730 cm.$^{-1}$.

The chlorine analysis of the product is about 10%.

It appears that the major constituent of the liquid product is a non-cyclic polymeric hydrogen phosphonate with pendant chloromethyl and hydroxymethyl groups.

In order to form the liquid product of Example 1 it is essential that the hydrogen chloride be removed as a gas from the reaction zone and not be allowed to react with a base such as pyridine for example. When such a process is employed, e.g. Verkade, J. Org. Chem., vol. 25, pages 663–5 (1960), all of the chlorine is accounted for as soluble Cl$^-$ from pyridine hydrochloride. The produce of such reaction is trimethylolpropane phosphite identical in every way with the trimethylolpropane phosphite obtained by transesterifying trimethylolpropane with triphenyl phosphite.

Example 2

One mol of trimethylolethane was reacted with 1 mol of phosphorus trichloride at 60–65° C. in the same manner as described in Example 1. The pot residue was a colorless, viscous liquid $n_d^{25}$ 1.4967.

The products of the present invention are valuable because of their effective anti-oxidant and lubricity properties when incorporated in synthetic lubricants, transmission fluids, etc. One of the outstanding features of the use of the novel compounds of the present invention, and particularly the trimethylolpropane-phosphorus trichloride product, as additives of this type is the wide temperature range over which they are effective. This is particularly attractive in view of the present trend towards effective high temperature lubricants and load bearing liquids.

Levels of concentration as low as 0.1% of the product of Example 1 or the product of Example 3 have been found effective in controlling oxidative breakdown of lubricating fluids.

The compounds of the invention also can be used as antioxidants for hydrocarbons, plasticizers for vinyl chloride resins, etc.

Example 3

50 mols of trimethylolpropane (6700 grams) were placed in a 12 liter flask equipped with a dip tube below the surface of the trimethylolpropane and a reflux condenser. The flask was heated to 69° C. and $PCl_3$ was then added gradually through the dip tube. The mixture was heated and there was a very slight reflux. The temperature rose to 105° C. over a period of 45 minutes. The temperature was maintained between 100 and 113° C. for 8 hours and 5 minutes and then was raised to 135° C. over 25 minutes.

One hour and 35 minutes after the start of the addition of the $PCl_3$ 1500 grams had been added, an hour later a total of 3000 grams of $PCl_3$ had been added. Six hours after the initial addition of $PCl_3$ a total of 4545 grams had been added and an hour and 20 minutes later a total of 5500 grams of $PCl_3$ had been added. The final $PCl_3$ was added 8 hours and 50 minutes after the beginning of such addition. In all 6910 grams of $PCl_3$ (slightly over 50 mols) were added.

The HCl which formed was removed as a gas through the reflux condenser and was weighed. Three hours and 25 minutes after the beginning of the reaction 950 grams of HCl had been collected, this was increased to 1600 grams 1 hour later and to 2360 grams after a further 1 hour and 35 minutes. Following an additional reaction period of 1 hour and 20 minutes 2850 grams total of HCl had been collected and after a further 1 hour and 30 minutes a total of 3880 grams had been collected. After the heating to 135° C. (i.e. 9 hours and 15 minutes from the start of the reaction) 3950 grams total (108.2 mol, based on the PCl₃ used, 65% of theory) hydrogen chloride was uncovered.

At the end of this time the batch was vacuum stripped to 165° C. at 10 mm. to remove a distillate in an amount of 30 grams, $n_d^{50}$ 1.4770. The residue in a yield of 9455 grams was the desired phosphorus and chlorine containing organic substance which had an infrared spectrum as shown in FIGURE 1 and an $n_d^{50}$ 1.4878.

*Example 4*

When the process of Example 3 was repeated but using a temperature of 50–60° C. (instead of 100–113° C.) it required 18 hours for the PCl₃ addition, 4 hours to heat to 135° C. and 3 hours for stripping. This is over twice the time required utilizing the temperature of 100–113° C. for reaction as in Example 3. Additionally, when utilizing a temperature of 50–60° C. there was encountered a problem of foaming during the reaction at 50–60° C. which was eliminated by following the procedure of Example 3. The yield of product in the 50–60° C. run was 9595 grams $n_d^{50}$ 1.4878 and the distillate stripped off in heating to 165° C. at 10 mm. was 135 grams. The hydrogen chloride removed as a gas weighed 3495.

The product of Example 3 from the performance standpoint, e.g. in lubricants was superior to the material of Example 1 since it had a lower acid number and in general was a purer product.

What is claimed is:

1. A viscous, colorless, odorless, non-volatile, non-cyclic, polymeric organic hydrogen phosphonate liquid product composed of chlorine, phosphorus, oxygen, hydrogen and carbon, said product having absorption bands in the infrared region of the spectrum at the following frequencies expressed in reciprocal centimeters an OH band at 3740,
   a CH stretch at 3100,
   a P—H band at 2500,
   a peak at 1480,
   an intense P=O band at 1285,
   an intense absorption in the O—P region ranging from 975 to 1080,
   a peak at 848,
   a peak at 798, and
   a peak at 730, said product containing chloromethyl group and hydroxymethyl group and stable at temperatures up to at least 160° C. and having the infra-red spectrum of FIGURE 1 of the drawing.

2. A process comprising reacting equimolar amounts of a trimethylolalkane of the group consisting of trimethylolpropane and trimethylolethane with phosphorus trichloride at a temperature between 40° C. and the boiling point of phosphorus trichloride, removing the hydrogen chloride formed as a gas and recovering the chlorine and phosphorus containing organic compound having a chloromethyl group.

3. A process according to claim 2 wherein the product obtained is heated in a vacuum.

4. A process comprising reacting equimolar amounts of trimethylolpropane with phosphorus trichloride at a temperature between 40° C. and the boiling point of phosphorus trichloride, removing the hydrogen chloride as a gas and recovering the chlorine and phosphorus containing organic residue as a viscous liquid, said organic residue containing a chloromethyl group.

5. A process comprising reacting equimolar amounts of a trimethylolalkane of the group consisting of trimethylolpropane and trimethylolethane with a phosphorus trichloride at a temperature of at least 40° C., removing the hydrogen chloride formed as a gas and recovering the chlorine and phosphorus containing organic compound having a chloromethyl group.

6. A process according to claim 5 wherein the product formed is heated in a vacuum.

7. A process comprising reacting equimolar amounts of trimethylolpropane and phosphorus trichloride at a temperature of at least 40° C., removing the hydrogen chloride formed as a gas and recovering the chlorine and phosphorus containing organic compound having a chloromethyl group.

8. A process according to claim 7 wherein the temperature is between 60 and 135° C.

9. A process according to claim 8 wherein the temperature is 100–110° C.

References Cited by the Examiner
UNITED STATES PATENTS 2,961,454  11/60  Gould et al. _____ 260—461
3,014,948  12/61  Birum _____ 260—461

OTHER REFERENCES

Carre: "Bull. Soc. Chim. France," vol. 27, pp. 261–269 (1902).

Lucas et al.: "J. Am. Chem. Soc." vol. 72, pp. 5491–5497 (1950).

Verkade et al.: "J. Org. Chem.," vol. 25, pp. 663–665 (April 1960).

CHARLES B. PARKER, *Primary Examiner.*

LEWIS GOTTS, IRVING MARCUS, *Examiners.*